No. 735,372. PATENTED AUG. 4, 1903.
E. M. HEDLEY.
METALLIC PACKING.
APPLICATION FILED MAR. 25, 1903.
NO MODEL.
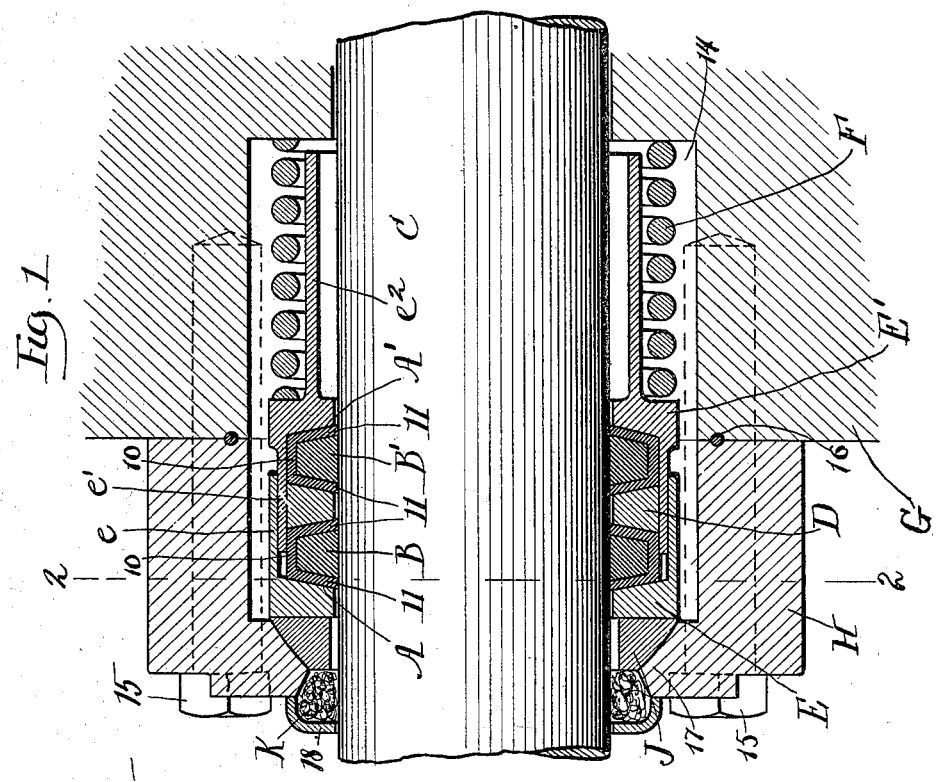
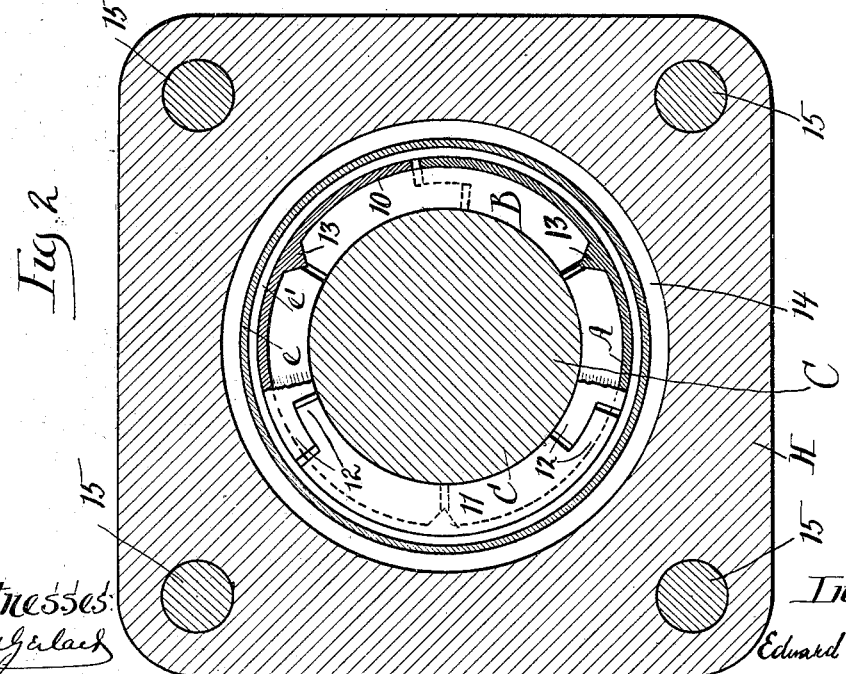
Witnesses
Fred Gerlach
Harry L. Clapp
Inventor:
Edward M. Hedley
By Pence & Fisher
Attorneys No. 735,372.

Patented August 4, 1903.

UNITED STATES PATENT OFFICE.

EDWARD M. HEDLEY, OF DEPEW, NEW YORK.

METALLIC PACKING.

SPECIFICATION forming part of Letters Patent No. 735,372, dated August 4, 1903.

Application filed March 25, 1903. Serial No. 149,476. (No model.)

*To all whom it may concern:*

Be it known that I, EDWARD M. HEDLEY, a citizen of the United States, and a resident of Depew, Erie county, New York, have invented certain new and useful Improvements in Metallic Packings, of which the following is declared to be a full, clear, and exact description.

The invention relates to metallic packings for piston-rods, valve-stems, and the like and seeks to provide a simple and effective arrangement for securely packing the rod which will take up little room and which will automatically adjust itself to compensate for wear.

The invention consists in the features of construction, arrangements, and combinations of parts set forth in the following description, illustrated in the accompanying drawings, and more particularly pointed out in the appended claims.

In the drawings, Figure 1 is a longitudinal section of the improved packing applied to a piston-rod. Fig. 2 is a cross-section on the line 2 2 of Fig. 1 with a part of one of the packing-rings broken away.

In the present improved construction packing-rings A A', of Babbitt or other suitable antifriction metal, are provided, each of which rings comprises an outer cylindrical portion 10 and inwardly-projecting side flanges 11, adapted to bear upon the piston-rod C. The outer faces of the side flanges 11 are conical, as indicated in Fig. 1, and the inner faces of these flanges are preferably also conical. The packing-rings A A' are formed of separate segmental sections, preferably three in number, having circumferentially-extended overlapping ends 12. The adjacent radial faces of the overlapping ends 12 are not in contact, so that the rings A A' may snugly fit the piston-rod C and may be contracted to compensate for wear; but the circumferential faces of these overlapping ends, as clearly shown in Fig. 2, are snugly fitted together to prevent leakage at these points.

Inner packing-rings B B', of Babbitt or other antifriction metal, are preferably provided with outer conical faces and are snugly fitted within the side flanges 11 of the packing-rings A A', with their inner faces flushed with the inner edges of said side flanges, so as to bear, together with the flanges 11, upon the piston-rod C. The inner packing-rings B B' (see Fig. 2) are formed of separate segmental sections, preferably three in number, and are so positioned that these sections break joints with the sections of the outer packing-rings A A'. The sections of the outer packing-rings A A' are provided midway between their ends with inwardly-projecting beveled abutments 13, extending part way between the ends of the sections of the inner rings B B', the ends of which are correspondingly chamfered or beveled. This arrangement insures that the sections of the separate rings will be held in position to break joints and prevent leakage.

One or more of the sectional outer rings A A', with one or more of the corresponding inner rings B B', may be employed, as desired or necessary. Where two or more sets of packing-rings are employed, they are held apart by separator-rings D, which are preferably continuous and formed of brass or other suitable material. The separator-ring D is provided with oppositely-disposed conical faces snugly fitting the outer conical faces of the adjacent packing-rings A A'.

The packing-rings A A' and the separator-ring D are preferably inclosed within a telescopic casing comprising the pressure-rings E E' and the overlapping cylindrical portions $e\ e'$, which extend about the packing and separator rings. The pressure-rings E E' are provided with conical faces which snugly fit and bear against the outer conical faces of the packing-rings A A', and the pressure-ring E' is preferably provided with a laterally-extending tubular section $e^2$, about which is coiled a spring F, which in use bears against the pressure-ring E'.

As indicated, the packing is set within a recess 14, formed in the cylinder-head G about the piston-rod C, and is held in place by a suitable gland H, securely fixed to the cylinder-head by bolts 15. A packing-gasket 16 of suitable material is usually interposed, as shown, between the glands H and the cylinder-head G. The outer end of the gland H is provided with an inwardly-extending flange or shoulder 17, within which is set a spacing-ring J, of brass or other suitable material.

The outer face of the spacing-ring J, which bears against the flange or shoulder 17, is preferably spherical, as indicated, and the adjacent face of the flange is correspondingly shaped. The inner face of the spacing-ring J, against which the pressure-ring E bears, is preferably square, as indicated. The coiled compression-spring F extends between the inner end of the recess 14 and the pressure-ring E', so that the packing-rings A A' and B B' are firmly held against the piston-rod C, and all wear of the packing-rings is automatically taken up by the pressure of the spring. A swab K of suitable material is held in place about the piston-rod C by a flanged ring 18, fixed to the outer end of the gland H.

The outer packing-ring, formed of segmental sections with overlapping ends and having inwardly-extending side flanges in connection with the inner packing-ring, the sections of which break joint with those of the outer packing-ring, a simple and effective metallic packing is provided which will prevent leaking, takes up but little room, may be brought to a snug bearing upon the piston-rod, and may be contracted to compensate for wear. The telescopic casing formed of the pressure-rings and overlapping cylindrical extensions in connection with the coiled compression-spring provide convenient means for automatically holding the packing and separator rings in position for automatically adjusting the packing-rings to compensate for any wear.

It will be noted that the packing-rings alone bear upon the piston-rod, while the adjacent parts—i. e., separator-ring and the telescopic casing—are held out of contact with the piston-rod by the packing-rings.

It is obvious that the improved packing may be employed for valve-stems, plunger-rods, and the like and that numerous changes could be made in the details of structure without departure from the essentials of the invention.

Having thus described my invention, what I claim as new, and desire to secure by Letters Patent, is—

1. In a metallic packing, an outer metallic packing-ring formed of separate, segmental sections having overlapping ends, each of said sections having integral, inwardly-projecting side flanges adapted to bear upon the rod and an inner, sectional metallic packing-ring snugly fitted within the side flanges of said outer ring and also adapted to bear upon the rod, the sections of one of said rings breaking joints with the sections of the other of said rings.

2. In a metallic packing, an outer metallic packing-ring formed of separate segmental sections having overlapping ends, each of said sections having integral, inwardly-projecting side flanges having outer conical faces and adapted to bear upon the rod, an inner, sectional metallic packing-ring snugly fitted within the side flanges of said outer ring and also adapted to bear upon the rod, the sections of one of said rings breaking joints with the sections of the other of said rings and means engaging the conical faces of said outer ring to yieldingly hold the rings in position.

3. In a metallic packing, an outer packing-ring provided with inwardly-projecting side flanges adapted to bear upon the rod, said ring being formed of separate segmental sections having circumferentially-extended, overlapping ends, an inner, sectional packing-ring snugly fitted within the side flanges of said outer ring and also adapted to bear upon the rod, the sections of one of said rings breaking joints with the sections of the other of said rings and means for holding the rings in position.

4. In a metallic packing, an outer packing-ring provided with inwardly-projecting side flanges adapted to bear upon the rod, said ring being formed of separate, segmental sections having overlapping ends, an inner, sectional packing-ring fitted within said side flanges and also adapted to bear upon the rod and abutments on the sections of one of said rings engaging the sections of the other of said rings to hold said sections in position to break joints.

5. In a metallic packing, a packing-ring provided with inwardly-projecting side flanges having outer conical faces and adapted to bear upon the rod, said ring being formed of separate segmental sections having overlapping ends, an inner, sectional packing-ring snugly fitted within the side flanges of said outer ring and also adapted to bear upon the rod, abutments fixed to the sections of said outer ring intermediate their ends and projecting between the sections of said inner ring to hold said sections in position to break joints and means engaging conical faces of said outer ring to yieldingly hold said rings in position.

6. In a metallic packing, an outer packing-ring provided with inwardly-projecting side flanges having outer conical faces and adapted to bear upon the rod, said ring being formed of separate, segmental sections having overlapping ends, an inner, sectional packing-ring snugly fitted within the said flanges of said outer ring, the sections of one of said rings breaking joints with the sections of the other of said rings, pressure-rings having conical faces bearing upon the conical faces of said outer ring and a spring bearing upon one of said pressure-rings.

7. In a metallic packing, separate, outer packing-rings provided with inwardly-projecting side flanges having outer conical faces and adapted to bear upon the rod, said rings being formed of segmental sections having overlapping ends, inner sectional packing-rings fitted between the side flanges of said outer rings and also adapted to bear upon the rod, the sections of said inner rings breaking joints with the sections of said outer rings, a separator-ring and pressure-rings having conical faces adapted to bear upon the conical faces of said outer packing-rings and a spring bearing upon one of said pressure-rings.

8. In a metallic packing, separate outer packing-rings provided with inwardly-projecting side flanges having outer conical faces and adapted to bear upon the rod, said ring being formed of segmental sections having overlapping ends, inner sectional packing-rings fitted between the side flanges of said outer rings and also adapted to bear upon the rod, the sections of said inner rings breaking joints with the sections of said outer rings, a separator-ring having conical faces interposed between said outer packing-rings, a telescopic casing comprising pressure-rings adapted to bear upon said outer packing-rings and laterally-extending tubular portions inclosing said packing-rings and said separator-ring and a spring adapted to bear upon one of said pressure-rings.

EDWARD M. HEDLEY.

Witnesses:
E. B. ROWLEY,
ANNA L. KENNEDY.